United States Patent [19]

Heller et al.

[11] Patent Number: 4,764,585

[45] Date of Patent: Aug. 16, 1988

[54] CATIONIC POLYCONDENSATES USEFUL FOR IMPROVING THE FASTNESS OF DYEINGS ON TEXTILES

[75] Inventors: Jürg Heller, Oberwil; Bruno Kissling, Hagendorf; Curt Muller, Binningen; Tibor Robinson, Basel; Salvatore Valenti, Binningen, all of Switzerland

[73] Assignee: Sandoz Ltd., Basel, Switzerland

[21] Appl. No.: 96,662

[22] Filed: Sep. 15, 1987

Related U.S. Application Data

[63] Continuation of Ser. No. 919,279, Oct. 15, 1986, abandoned, which is a continuation-in-part of Ser. No. 754,737, Jul. 15, 1985, abandoned.

[30] Foreign Application Priority Data

| Jul. 21, 1984 | [DE] | Fed. Rep. of Germany | 3426927 |
| Jul. 21, 1984 | [DE] | Fed. Rep. of Germany | 3426928 |
| Nov. 22, 1984 | [DE] | Fed. Rep. of Germany | 3442482 |
| Jan. 19, 1985 | [DE] | Fed. Rep. of Germany | 3501645 |
| Apr. 1, 1985 | [DE] | Fed. Rep. of Germany | 3511857 |

[51] Int. Cl.$^4$ .............................. C08G 12/02
[52] U.S. Cl. ............................. 528/233; 8/536; 8/543; 8/556; 528/232; 528/236; 528/238; 528/239; 528/243; 528/250; 528/254; 528/256; 528/257; 528/258; 528/266; 528/268; 528/269
[58] Field of Search ................ 8/536, 543, 556; 528/232, 233, 236, 238, 239, 250, 254, 256, 257, 258, 266, 268, 269

[56] References Cited

U.S. PATENT DOCUMENTS

| 3,000,863 | 9/1961 | Lineken | 8/556 |
| 3,490,859 | 1/1970 | Soiron et al. | 8/556 |
| 3,873,266 | 3/1975 | Hofer et al. | 8/556 |
| 4,316,005 | 2/1982 | Wurster et al. | 528/258 |
| 4,380,603 | 4/1983 | Bankert | 524/598 |
| 4,382,129 | 5/1983 | Bankert | 524/598 |
| 4,475,918 | 10/1984 | Kissling et al. | 8/495 |
| 4,511,707 | 4/1985 | Runyon et al. | 528/250 |

FOREIGN PATENT DOCUMENTS

| 1047917 | 12/1953 | France . |
| 36-1736 | 3/1961 | Japan . |
| 45-2352 | 1/1970 | Japan . |
| 48-39781 | 6/1973 | Japan . |

*Primary Examiner*—Lucille M. Phynes
*Attorney, Agent, or Firm*—Gerald D. Sharkin; Richard E. Vila; Thomas C. Doyle

[57] ABSTRACT

Cationic fixing agents based on the reaction products of
(a) a monofunctinal or polyfunctional amine having one or more primary and/or secondary and/or tertiary amino groups and
(b) cyanamide, dicyandiamide, guanidine or bisguanidine give improved results when the reaction takes place in the presence of a catalyst (K) selected from metals, metal salts and hererocyclic nitrogen-containing organic bases, particularly zinc chloride.

20 Claims, No Drawings

CATIONIC POLYCONDENSATES USEFUL FOR IMPROVING THE FASTNESS OF DYEINGS ON TEXTILES

This is a continuation of application Ser. No. 919,279, filed Oct. 15, 1986, now abandoned, which in turn is a continuation-in-part of Ser. No. 754,737, filed July 15, 1985, now abandoned.

This invention relates to cationic polycondensates useful to improve the fastness properties of dyed, printed or optically brightened textile fibres or leather.

It is known from U.S. Pat. Nos. 4,410,652, 4,439,203 and 4,439,208 that the fastness properties of direct, reactive and basic dyeings on textile fibres may be improved by aftertreatment with certain cationic fixing agents based upon the reaction products of amines with cyanamide, dicyandiamide, guanidine and bisguanidine. It has now been found that superior results are obtained when the above reaction products are formed in the presence of a catalyst.

Accordingly, the present invention provides a cationic polycondensate which is (A) the product of reacting (a) a monofunctional or polyfunctional amine having one or more primary and/or secondary and/or tertiary amino groups with (b) cyanamide, dicyandiamide, guanidine or bisguanidine, in which up to 50 mole percent of the cyanamide, dicyandiamide, guanidine or bisguanidine may be replaced by a dicarboxylic acid or a mono- or di-ester thereof, in the presence of a catalyst (K), said product (A) containing at least one free hydrogen atom linked to a nitrogen atom; or (B) the product of reacting (A) with:
(c) an N-methylol derivative of a urea, melamine, guanamine, triazine, urone, urethane or acid amide, or
(d) an epihalohydrin or a precursor thereof, or
(e) formaldehyde or a compound which releases formaldehyde; or
(C) the product of reacting (A) with [(d) and (c)] or with [(e) and (c)].

When an N-methylol derivative (c) is a reactant, it is preferably reacted in the presence of (K1) a catalyst for the cross-linking of N-methylol compounds.

All of the above polycondensates may be either in free base or wholly or partly in acid addition salt form.

The reaction of (a) with (b) to give polycondensate (A) is carried out by reacting the amine (a), in free base or salt form, with component (b) in the absence of water and preferably in the absence of other solvents, at temperatures above 50° C., preferably 60°–200° C., more preferably 80°–180° C., particularly 140°–160° C. The reagents are preferably reacted in a molar ratio of 0.1 to 1 mole of cyanamide, DCDA, guanidine or biguanidine per mole of reactive —NH or —NH$_2$ groups, and when DCDA is reacted with a polyalkylene polyamine, the molar ratio of the reactants is preferably from 0.75:1.25 to 1.25:0.75, particularly about 1:1.

Preferably component (a) is mixed with catalyst (K) and component (b) is added, but it is also possible to mix (a), (b) and (K) from the start or to mix (b) and (K) and add (a), or to add (K) to a mixture of (a) and (b), preferably at about 130° C. Reaction of (a) and (b) should normally be continued until evolution of ammonia has ceased.

It is found that in the presence of the catalyst (K), the reaction proceeds to a more complete stage, and more ammonia is evolved, than in the absence of catalyst. Thus, for a 1:1 molar ratio of (a) and (b), although the theoretical amount of ammonia evolved is 2.0 mole, in practice only approx. 1.5 mole ammonia are evolved if no catalyst is used. In the presence of catalyst, from 1.6–1.9 moles, particularly approx. 1.8 moles, ammonia may be evolved, and the resulting polycondensate has a higher molecular weight as shown by viscosity measurements than when no catalyst is used.

The product is preferably neutralized with an inorganic acid for example sulphuric acid, and may be used in aqueous solution or may be converted to solid form for example by spray drying.

The catalyst (K) is selected from metals, metal salts and heterocyclic nitrogen-containing organic bases. The metal or metal salt is preferably a metal or salt of a metal from Group II or III of the periodic table, especially salts of metals of Group II, more preferably zinc salts, particularly zinc chloride. The quantity of metal salt catalyst used is suitably 0.01–10%, preferably 0.1–5%, more preferably 0.2–1%, particularly 0.2–0.5%, more particularly 0.2–0.48%, most particularly 0.2–0.34%, especially 0.2–0.3%, most especially 0.3% by weight based on the total weight of components (a) and (b).

Preferred heterocyclic base catalysts are pyridine compounds, more preferably pyridines substituted by a tertiary amino group, such as a di(C$_{1-4}$alkyl)amino group or a N-heterocyclic group. Dimethylaminopyridines, particularly 4-dimethylaminopyridine, are most preferred. Such catalysts are suitably used in the amount of 0.01–10%, preferably 0.1–7%, more preferably 4.5–5.5%, particularly 5% by weight based on the total weight of components (a) and (b).

The preferred catalysts (K) are the metal salts, particularly zinc chloride.

Component (a) is preferably an amine of formula I

R—NH—R    I or, preferably, a polyalkylene polyamine of formula II

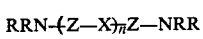

RRN—(Z—X)$_n$Z—NRR    II in which
each R independently is hydrogen or a C$_{1-10}$alkyl group unsubstituted or monosubstituted with hydroxy, C$_{1-4}$alkoxy or cyano,
n is a number from 0 to 100
Z, or each Z independently when n>0, is C$_{2-4}$ alkylene or hydroxyalkylene and
X, or each X independently when n>1, is —O—, —S— or —NR— where R is as defined above,
provided that the amine of formula II contains at least one reactive —NH— or —NH$_2$ group.

More preferably each R in II is hydrogen, n is 0 to 4, X is NH or —NCH$_3$— and Z, or each Z independently when n>0, is C$_{2-4}$ alkylene. Particularly preferred compounds are diethylene triamine, triethylene tetramine, tetraethylene pentamine, 2-aminoethyl-3-aminopropylamine, dipropylene triamine and N,N-bis-(3-aminopropyl)methylamine.

The preferred component (b) is dicyandiamide (DCDA). Particularly preferred polycondensates (A) are the products of reacting diethylene triamine or triethylene tetramine with DCDA in the presence of zinc chloride.

The products (A) are near-colourless viscous liquids or solids which are basic in character, water-soluble either in the free base or salt form, and contain reactive hydrogen atoms bonded to nitrogen. Their aqueous solutions have a pH value of 10–12, preferably 10.5–11.

Up to 50% mole, preferably up to 20% mole of the DCDA or other reagent to be reacted with the amine may be replaced by a dicarboxylic acid or a mono- or di-ester thereof. Suitable acids include adipic acid, oxalic acid and terephthalic acid, for example in the form of their dimethyl esters.

Polycondensates (B) formed by reacting (A) with an N-methylol compound (c) optionally in the presence of catalyst (K1) may be produced as described in U.S. Pat. No. 4,410,652, the disclosure of which is incorporated herein by reference. In this U.S. patent, the suitable and preferred N-methylol compounds (c) and catalyst (K1) are described as intermediate products (B) and catalysts (C) respectively, and the products corresponding to polycondensates (A) (although not prepared in the presence of catalyst (K)) are described as intermediate products (A).

Polycondensates (B) formed by reacting (A) with (d) or (e), and polycondensates (C) formed by reacting (A) with (d) and (c) or with (e) and (c), optionally in the presence of a catalyst (K1), may be produced as described in U.S. Pat. No. 4,439,203, the disclosure of which is incorporated herein by reference. In this U.S. patent, the epihalohydrin (d), formaldehyde (e), N-methylol compounds (c) and catalyst (K1) are designated (B), (C), (E) and (F) respectively, and the products corresponding to polycondensates (A) (although not prepared in the presence of catalyst (K)) are described as component (A). Preferred reaction conditions and preferred quantities of reagents may be taken directly from U.S. Pat. No. 4,439,203. The reaction of (A) with formaldehyde (e) is preferably carried out in aqueous medium at 20°–60° C., and at a pH>4, preferably between 7 and 11. The formaldehyde may be added in the form of a concentrated (e.g. 37%) aqueous solution. Preferred mole ratios of compound (A) to formaldehyde are in the range 1:2–1.6, based on the number of moles of amine originally present.

It will be noted that the same metal salt compound, for example zinc chloride, may be both a catalyst (K) for the reaction of (a) with (b) according to the present invention, and also a catalyst (K1) for the crosslinking of N-methylol compounds. Accordingly, in cases where catalyst (K) is used in sufficient quantities in the preparation of (A), and is not removed in subsequent operations, the residual catalyst (K) may also function as catalyst (K1) in subsequent steps such as the reaction of (A) with N-methylol compound (c). Preferably however, a separate catalyst (K1), more preferably magnesium chloride, is added.

A further useful product is a polycondensate obtained in the form of a stable dispersion by reacting (A) and (d) and acidifying the reaction product, optionally in the presence of a water-soluble polymer, as described in published British Patent Application No. 2 142 642 A.

The present invention also provides a process for improving the fastness properties of a dyestuff or optical brightener on a substrate comprising leather or hydroxy-, amino- or thiol group-containing textile fibres, which process comprises applying to a dyed, printed or brightened substrate a composition comprising one or more polycondensates (A), (B) or (C) as defined above, or a mixture of an N-methylol compound (c) with (A) or with the reaction product of (A) with (d) or (e), and, if (A) is reacted with (c) or (e), or if unreacted (c) is present, together with a catalyst (K1) for the cross-linking of N-methylol compounds.

As described above, residual catalyst (K) may function as catalyst (K1), but preferably catalyst (K1), which is preferably magnesium chloride, is added separately.

Corresponding aftertreatment processes are described in U.S. Pat. Nos. 4,410,652, 4,439,203 and 4,439,208 and the conditions described in these patents may be applied to the present invention. The disclosure of U.S. Pat. No. 4,439,208 is likewise incorporated herein by reference.

The textile fibres are preferably hydroxy group-containing fibres, particularly natural or regenerated cellulosic fibres, especially cotton. Useful results are also obtainable on nitrogen-containing fibres such as polyacrylonitrile and natural or synthetic polyamides, preferably wool, silk or nylon. Acid modified polyester and polyamide, which contain acidic hydroxy groups, may also be used.

The fibres may be in the form of loose fibres or yarns or fabrics, or in any suitable form. Fabrics are a convenient and preferred form. The fibres may be blended with other fibres which are susceptible of treatment by the process of the invention or with fibres which are not so susceptible. For example, cotton and regenerated cellulose fibres may be blended together or individually with polyester fibres, the latter being dyed with disperse dyes. Fibre blends and yarn blends may be used.

The process may be used in the dyeing of leather.

The fibres may be dyed or printed with anionic dyestuffs, including direct dyes, acid dyes and reactive dyes, or with basic dyestuffs. Preferred dyes are direct dyes, preferably those having at least two sulphonic acid or sulphonamide groups in the dye molecule, more preferably 3–8 such groups, particularly 4–6. Particularly preferred are highly substantive direct dyes which show a high degree of exhaust on cotton when dyed by the conventional exhaust process. Preferably the direct dyes have a molecular weight above 1000, more preferably above 1200. Preferably the direct dyes are in the form of 1:1 or 1:2 metal complexes, particularly copper complexes.

Particularly suitable direct dyes are those meeting the criteria set out in U.S. Pat. No. 4,410,652, the dyes whose formulae are listed in that U.S. patent, and those listed in U.S. Pat. No. 4,439,203 under their Colour Index numbers.

A further group of particularly suitable dyes have the properties both of direct dyes and of reactive dyes. They are highly substantive as described above, and also contain in their molecular one or more halogens attached to aromatic heterocyclic rings, which can be split off as an anion under alkali fixation conditions. Preferred dyestuffs of this type contain one or two mono- or di-halo (particularly chloro-) substituted triazinyl groups.

Examples of dyestuffs with one such group correspond to formula III

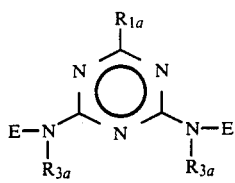

in which each $R_{3a}$ independently is hydrogen; $(C_{1-4})$alkyl; or $(C_{1-4})$alkyl substituted by one —OH, —CN or phenyl group;

$R_{1a}$ is Cl or F, particularly Cl and,

E are identical or different chromophoric groups.

Examples of dyestuffs with two triazinyl groups are those of formula IV

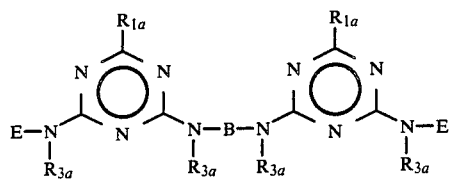

in which $R_{1a}$, $R_{3a}$ and E are as defined above, and B is a direct bond or a divalent aliphatic, aromatic, cycloaliphatic or heterocyclic bridging group, or forms a heterocyclic bridging group together with the two

groups to which it is joined.

In the compounds of formulae III and IV, the chromophoric group E can be identical or different residues of mono- or polyazo dyes, or of anthraquinone, stilbene, hydrazone, methine or azomethine dyes, in which the mono- or polyazo dye residues may be in the form of 1:1 or 1:2 metal complexes, such as 1:1 copper, chromium, cobalt, nickel or manganese or 1:2 chromium, cobalt or iron complexes.

The bridging group B is preferably of formula

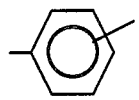

or

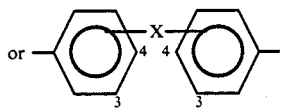

in which X can be bound in the 4,4-, 3,4- or 3,3-positions and represents a direct bond or a bridging group such as is conventional in the chemistry of direct dyestuffs, or may form a piperazine ring together with the two

groups to which it is bound.

Suitable triazinyl group-containing dyestuffs are disclosed in British published Patent Application Nos. 2,106,126 A, 2,111,538 A and 2,122,634 A.

Suitable dyestuffs for use in dyeing polyamide to be aftertreated according to the invention are known under the description of C.I. Acid Dyes.

The textile fibres may be dyed or printed with reactive dyes, particularly those containing a 5- or 6-membered heterocyclic ring having aromatic character and containing 2 or 3 nitrogen atoms, which is substituted by 1-3 halogen atoms which can be split off as anions during fixation. The reactive group can also be a vinylsulphonyl-, vinylcarbonyl-, sulphato- or sulphate ester group. Such dyes are known under the designation C.I. Reactive Dyes.

Suitable reactive dyes include C.I. Reactive Reds 2, 6, 8, 120, 123 and 171; C.I. Reactive Blues 94, 104, 114, 116, 163, 168, 172 and 193; C.I. Reactive Yellows 7, 84 and 111; C.I. Reactive Oranges 4, 14 and 69; C.I. Reactive Browns 10 and 23; C.I. Reactive Black 8 and C.I. Reactive Violet 33.

Basic dyestuffs suitable for use in conjunction with the process step according to the invention are generally those designated as C.I. Basic Dyes. They contain protonatable primary, secondary or tertiary amino groups and/or quaternary ammonium groups, and may also contain sulphonic acid groups, provided that the number of basic groups is higher than the number of acid groups in the molecule. Basic dyes may also be in the form of 1:1 or 1:2 metal complexes. Suitable basic dyes are described for example in U.S. Pat. No. 4,439,208.

In addition to the above-mentioned anionic and basic dyes, it is also possible to dye or print the textile fibres with phthalocyanine, sulphur, vat, formazan, di- or tri-phenylmethane or indigo dyestuffs.

For dyeings on wool, acid or metallised dyes may be used in conventional manner, followed by aftertreatment under mild alkaline conditions. Particularly suitable dyes include for example:

C.I. Acid Yellow 127
C.I. Acid Orange 67
C.I. Acid Red 412, 336, 339, 399
C.I. Acid Blue 126, 296.

The wool substrate may be chlorinated or unchlorinated. Treatment of a dyed wool substrate according to the invention may impart some degree of shrink-proofing as well as improving the wet fastness of the dyeing.

Optical brighteners may also be used, preferably anionic optical brighteners which are substantive to cotton.

According to a further aspect of the invention there is provided a process for the dyeing or printing of a substrate comprising textile fibres containing cellulosic, polyamide, acid-modified polyamide or acid-modified polyester fibres, comprising the step of treating the substrate simultaneously with a basic dyestuff and with a polycondensate (A), (B) or (C), optionally in the presence of a catalyst (K1).

In a preferred aftertreatment process using polycondensate (A), the dyed substrate, which may be dried or damp, is entered to the aftertreatment bath at room temperature. The bath contains the requisite quantity of (A) together with 5-10 g/l of an electrolyte and is adjusted to pH 10-11 by addition of aqueous sodium carbonate solution or more preferably is adjusted to pH 7-9. If the bath already has the desired pH, no adjustment is necessary. The bath is heated over 10 min. to 60° C. and fixation is carried out at this temperature for 20 minutes. Finally the aftertreated dyeing is rinsed, if necessary neutralised, and dried.

If the polycondensate contains N-methylol groups; for example a polycondensate (B) formed by reaction of (A) with (c) or with (e), or a polycondensate (C) or mixtures containing free (c), then the preferred method of application is by padding at room temperature as discribed in U.S. Pat. No. 4,410,652, followed by a thermal fixation step. The fixation step is preferably carried out by heating to a temperature of 80°–180° C., preferably 170°–180° C., for 30 seconds to 1 minute.

Dyeings and printings aftertreated according to the invention show better wet fastness properties than similar dyeings and printings aftertreated with precondensates made in the absence of catalyst (K).

The following examples, in which all parts and percentages are by weight and temperatures are in degrees Centigrade, illustrate the invention. Intrinsic viscosities are measured in water at 26° and calculated on the basis of the solid polycondensate.

Preparation of Polycondensate (A)

EXAMPLE 1

A mixture of 82.4 parts diethylene triamine (0.8 mole), 62.7 parts DCDA (0.8 mole) and 1.5 parts zinc chloride is heated over two hours to 150°, with stirring until all dissolves. The reaction mixture is then stirred for 4 hours at 150°.

Finally the molten reaction product is poured onto a cold plate, allowed to solidify and powdered. The powder may be used as an aftertreatment agent without further work-up.

60 Parts of the powder are stirred slowly into 60 parts water at 35° and neutralised with 47 parts 50% sulphuric acid, 40 parts ice being added to keep the temperature below 50°. A solution of the sulphate salt of (A), containing approx. 40% dry weight of active material, is obtained. The addition salt may be used in liquid form or converted to a powder by spray drying.

EXAMPLE 2

Example 1 is repeated using (a) 0.35 parts magnesium chloride or (b) 0.7 parts barium chloride (c) 0.5 parts aluminium chloride in place of the 1.5 parts of zinc chloride.

If barium chloride is used as catalyst it is preferable to use hydrochloric acid instead of sulphuric acid to neutralise the reaction product, to avoid formation of insoluble salts.

EXAMPLE 3

Example 1 is repeated using 0.8 mole of (a) triethylenetetramine or (b) tetraethylenepentamine or (c) ethylene diamine in place of the diethylene triamine.

EXAMPLE 4

309 Parts (3 moles) diethylene triamine is stirred together with 1.68 parts (corresponding to 0.3% based on amine +DCDA) of ZnCl$_2$. Over 30 minutes 252 parts (3 moles) DCDA are added, the temperature rising to 30°. The resulting suspension is stirred and heated to 100° over 50 minutes, giving a clear solution. Over 85 minutes the mixture is heated to 160°, whereby evolution of ammonia begins at 110° and is stronger at 130°. The ammonia is absorbed in 500 ml water and continuously titrated with 35% hydrochloric acid to measure the quantity of ammonia evolved. As ammonia is evolved the reaction mixture first becomes cloudy, then gives a clear mobile melt which gradually becomes more viscous.

The mixture is stirred for 2 hours at 160°, until a total of 1.8 moles ammonia has been evolved. The reaction product is then poured slowly into 600 parts water, the temperature remaining under 30°. Finally the alkaline solution is neutralised by dropwise addition of sulphuric acid at 20°–30°. A milky liquid is obtained, which can be used directly, or converted to powder by spray drying.

The intrinsic viscosity of the resulting product is 0.06 cm$^3$/g. By comparison, the product made without zinc chloride has a intrinsic viscosity of 0.041 cm$^3$/g.

EXAMPLE 5

Example 1 is repeated using 7.5 parts 4-dimethylaminopyridine in place of 1.5 parts zinc chloride. A liquid product of ~55% solids and an inherent viscosity of 0.037 cm$^3$/g at 26° is obtained, which can be used directly as an aftertreatment agent.

EXAMPLE 6

Example 5 is repeated using in place of the 7.5 parts of 4-dimethylaminopyridine equivalent amounts of

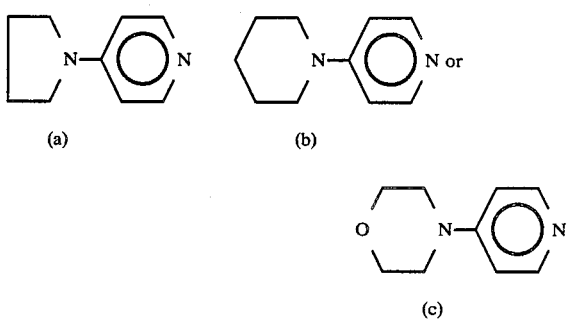

Similar products are obtained.

EXAMPLE 7

Example 5 is repeated using in place of diethylene triamine equivalent amounts of (a) triethylenetetramine, (b) tetraethylenepentamine or (c) ethylene diamine.

Preparation of polycondensates (B) and (C)

EXAMPLE 8

457 Parts of a 50% solution of dimethyloldihydroxyethyleneurea are heated to 70° with 23 parts DCDA (as stabilizer) and stirred at this temperature while 68.5 parts of the spray dried product of Example 4 (sulphate salt) are slowly added. After stirring for 3 hours at 70° the mixture is cooled and 69 parts magnesium chloride hexahydrate are added. The resulting mixture may be used directly as an aftertreatment agent.

EXAMPLE 9

100 Parts of a 50% solution of dimethylolhydroxyethyleneurea are warmed to 70°–80° and stirred with 20 parts magnesium chloride hexahydrate. To the resulting clear solution is added portionwise 40 parts of the spray dried product of Example 4 (sulphate salt) and the mixture stirred at 70° until all is dissolved. The reaction is completed by stirring at this temperature for a further 2½ hours. A clear liquid is obtained which can be diluted with water and which can be used as an aftertreatment agent directly or after further dilution. The intrinsic viscosity is 0.052 cm³/g.

EXAMPLE 10

672 Parts of the sulphate salt solution product of Example 4 are adjusted to pH 7.5-7.8 by addition of 23 parts 30% aqueous sodium hydroxide solution. (The pH was measured on samples diluted to 1% solids content.) The solution is warmed to 50° and stirred at this temperature for 1 hour while 65.6 parts epichlorohydrin is slowly added. The mixture is stirred for a further 2 hours at 50° to complete the reaction, then cooled to room temperature and adjusted to a pH of 2.5-3.0 by addition of 50 parts concentrated sulphuric acid, with external cooling to keep the temperature below 30°.

The reaction mixture is finally exposed to a vacuum of 15-20 mm Hg at 50° for 15-20 minutes to remove volatile organic compounds. The product is adjusted to 55% solids content by addition of water, giving a milky liquid. Intrinsic viscosity 0.045 cm³/g.

EXAMPLE 11

To 100 parts of the product of Example 10 is added 100 parts of 50% aqueous dimethyloldihydroxyethyleneurea and 7.5 parts magnesium chloride hexahydrate, and the mixture is stirred together for 3 hours at 70°. A clear solution results which can be used directly as an aftertreatment agent.

APPLICATION EXAMPLES

EXAMPLE 12

A cotton fabric is exhaust dyed with 3% (based on dry weight of substrate) of C.I. Direct Blue 251 and thoroughly rinsed. The dyed and rinsed substrate is treated at a liquor to goods ratio of 20:1 with a bath containing 1 g/l of the solid product of Example 4, 5 g/l sodium chloride and acetic acid to pH 4.5, at 60° for 30 minutes. The aftertreated substrate is rinsed with cold water and dried. The resulting dyeing has extremely high wash fastness.

EXAMPLE 13

Example 12 is repeated, using an aftertreatment bath adjusted to pH 11-11.5 with sodium carbonate instead of to pH 4.5 with acetic acid. The resulting dyeing has good fastness to washing at the boil.

Similar good results are obtained using the products of Examples 1-3, 5-7 and 10.

EXAMPLE 14

A cotton fabric is dyed in conventional manner at 2/2 standard depth with the dyestuff C.I. Reactive Violet 23, rinsed and dried. The dyed substrate is then padded at 80% pick up with a solution containing 130 g/l of the product of Example 8. The padded substrate is dried to a residual moisture content of 2-4% and finally heat cured at 180° for 30-45 seconds. The fixed dyeing has excellent wash fastness properties.

The handle of the aftertreated fabric is improved if 10 g/l of a conventional anionic softener and 1 g/l of a conventional non-ionic wetting agent are added to the padding liquor.

Similar good results are obtained using the products of Examples 9 and 11.

EXAMPLE 15

Example 12 is repeated using an after-treatment bath having a pH of 7 instead of pH 4.5. The resulting dyeing has extremely high wash-fastness.

Similar good results are obtained using the products of Examples 1-3, 5-7 and 10.

What is claimed is:

1. A cationic polycondensate which is
(A) the product of reacting
   (a) a monofunctional or polyfunctional amine having one or more primary and/or secondary and/or tertiary amino groups and containing at least one reactive —NH— or —NH$_2$— group with
   (b) cyanamide, dicyandiamide, guanidine or bisguanidine, in which up to 50 mole percent of the cyanamide, dicyandiamide, guanidine or bisguanidine may be replaced by a dicarboxylic acid or a mono- or di-ester thereof, in the presence of a catalyst (K) selected from metals, metal salts and heterocyclic nitrogen-containing organic bases, provided that when (K) is a metal salt it is used in an amount of 0.2 to 0.48% by weight, based on the total weight of (a) and (b), said product (A) containing at least one free hydrogen atom linked to a nitrogen atom;
or
(B) the product of reacting (A) with:
   (c) an N-methylol derivative of a urea, melamine, guanamine, triazine, urone, urethane or acid amide, or
   (d) an epihalohydrin or a precursor thereof, or
   (e) formaldehyde or a compound which releases formaldehyde; or
(C) the product of reacting (A) with (d) and (c) with (e) and (c).

2. A cationic polycondensate according to claim 1 in which component (a) is an amine of formula I

$$R-NH-R \qquad \text{I}$$

or a polyalkylene polyamine of formula II

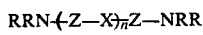

$$RRN(Z-X)_nZ-NRR \qquad \text{II}$$

in which
each R independently is hydrogen or a C$_{1-10}$alkyl group unsubstituted or monosubstituted with hydroxy, C$_{1-4}$alkoxy or cyano,
n is a number from 0 to 100
Z, or each Z independently when n>0, is C$_{2-4}$ alkylene or hydroxyalkylene and
X, or each X independently when n>1, is —O—, —S— or —NR— where R is as defined above,
provided that the amine of formula II contains at least one reactive —NH— or —NH$_2$ group.

3. A cationic polycondensate according to claim 2 in which component (a) is diethylene triamine, triethylene tetramine, tetraethylene pentamine, 2-aminoethyl-3-aminopropylamine, dipropylene triamine or N,N-bis-(3-aminopropyl)methylamine.

4. A cationic polycondensate according to claim 1 in which component (b) is dicyandiamide.

5. A cationic polycondensate according to claim 1 in which the catalyst (K) is a pyridine compound.

6. A cationic polycondensate according to claim 5 in which the catalyst (K) is 4-dimethylaminopyridine.

7. A cationic polycondensate according to claim 1 in which the catalyst (K) is a salt of a metal of Group II or Group III.

8. A cationic polycondensate according to claim 7 in which the catalyst (K) is zinc chloride.

9. A cationic polycondensate according to claim 7 in which the concentration of catalyst (K) is 0.2–0.3% by weight based on the total weights of components (a) and (b).

10. A cationic polycondensate according to claim 1 in which polycondensate (A) is the product of reacting (a) diethylene triamine or thriethylene tetramine with (b) dicyandiamide in the presence of (K) from 0.2–0.48% by weight, based on (a)+(b), of zinc chloride.

11. A cationic polycondensate according to claim 10 which is polycondensate (A).

12. A cationic polycondensate according to claim 10 which is the product of reacting (A) with an N-methylol compound (c).

13. A cationic polycondensate according to claim 12 which is the product of reacting (A) with (c) in the presence of magnesium chloride.

14. A cationic polycondensate according to claim 10 which is the product of reacting (A) with formaldehyde (e) in aqueous medium at 20°–60° C. and pH 4.

15. A cationic polycondensate according to claim 10 which is the product of reacting (A) with epochlorohydrin and acidifying the product.

16. A process for improving the fastness properties of a dyestuff or optical brightener on a substrate comprising leather or hydroxy-, amino- or thiol group-containing textile fibres, which process comprises applying to a dyed, printed or brightened substrate a composition comprising one or more polycondensates (A), (B) or (C) as defined in claim 1 or a mixture of an N-methylol compound (c) with (A) or with the reaction product of (A) with (d) or (e), and, if (A) is reacted with (c) or (e), or if unreacted (c) is present, together with a catalyst (K1) for the cross-linking of N-methylol compounds.

17. A process according to claim 16 in which a direct or reactive dyeing on cotton is treated with a polycondensate (A) or with the product of reacting (A) with (c) in the presence of a catalyst (K1)

18. A cationic polycondensate according to claim 2 in which the catalyst (K) is a salt of a metal of Group II or Group III or a pyridine compound, said pyridine compound being used in an amount of 0.01 to 10% by weight, based on the total weight of (a) and (b).

19. A cationic polycondensate according to claim 3 in which component (b) is dicyandiamide and the catalyst (K) is a salt of a metal of Group II or Group III or a pyridine compound, said pyridine compound being used in an amount of 0.01 to 10% by weight, based on the total weight of (a) and (b).

20. A cationic polycondensate according to claim 19 which is a product (A).

* * * * *